No. 641,729. Patented Jan. 23, 1900.
T. C. ROBINSON.
BICYCLE DRIVING MECHANISM.
(Application filed Nov. 12, 1898.)
(No Model.) 2 Sheets—Sheet 1.
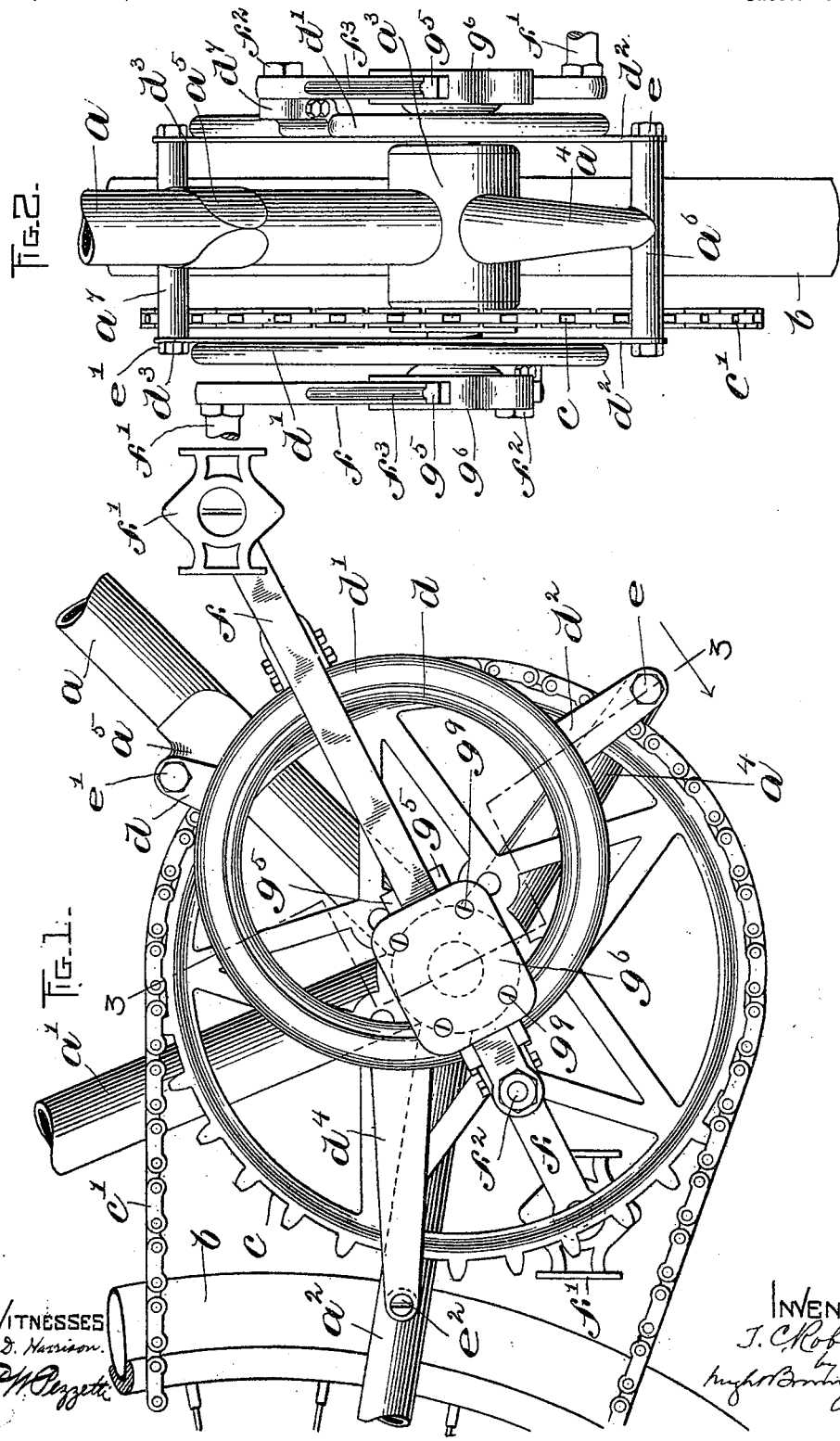

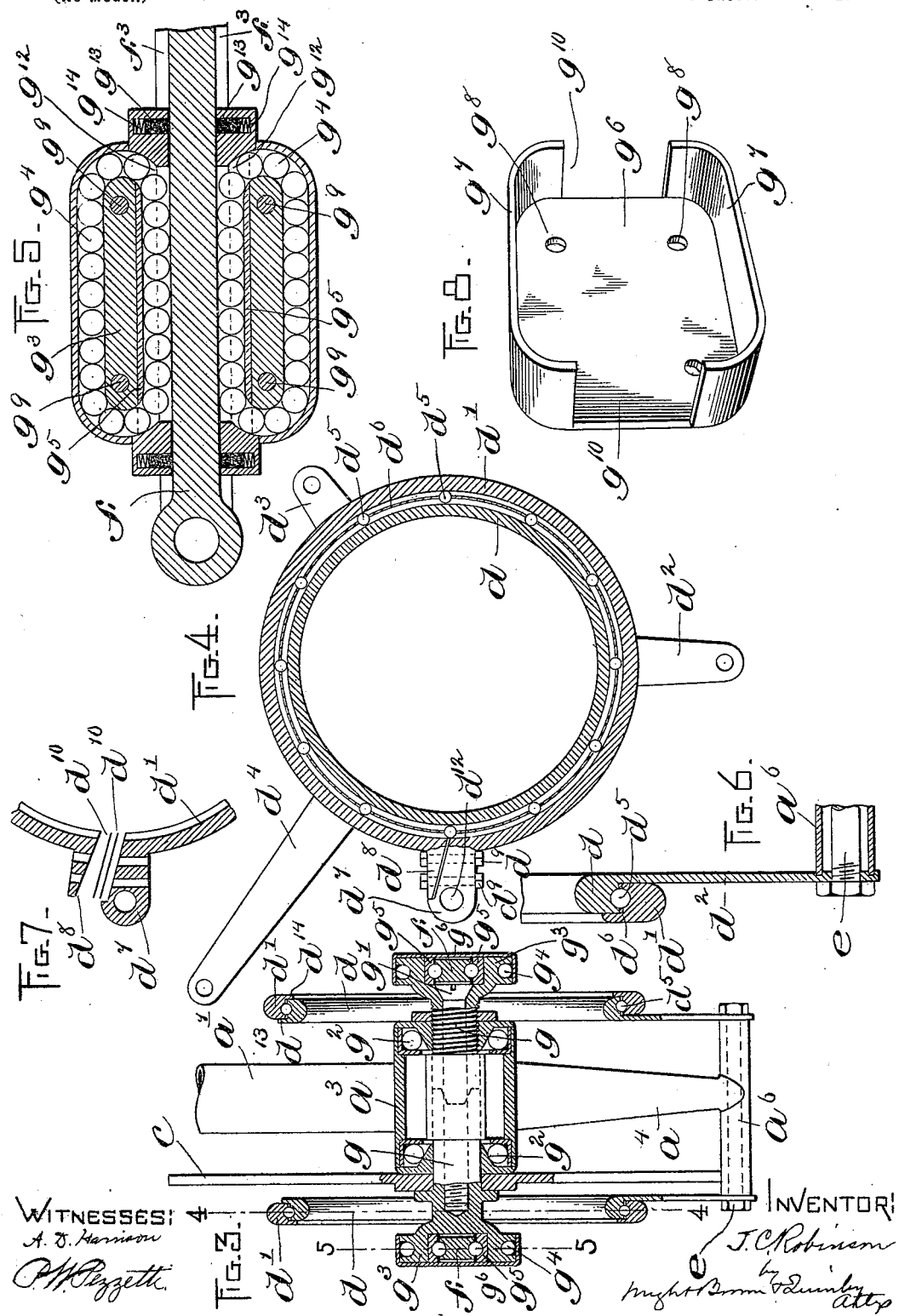

UNITED STATES PATENT OFFICE.

THOMAS C. ROBINSON, OF REVERE, MASSACHUSETTS, ASSIGNOR OF ONE-HALF TO E. BAKER WELCH, OF CAMBRIDGE, MASSACHUSETTS.

BICYCLE DRIVING MECHANISM.

SPECIFICATION forming part of Letters Patent No. 641,729, dated January 23, 1900.

Application filed November 12, 1898. Serial No. 696,210. (No model.)

*To all whom it may concern:*

Be it known that I, THOMAS C. ROBINSON, of Revere, in the county of Suffolk and State of Massachusetts, have invented certain new and useful Improvements in Bicycle Driving Mechanism, of which the following is a specification.

This invention relates to driving mechanisms for bicycles and other vehicles of the kind which employs eccentrics for controlling the crank mechanism whereby the length of the cranks varies in different portions of the stroke, being longer on the downstroke, where most of the rider's power is available, than on the upstroke.

The invention has for its object to improve the connections between the cranks and the crank-axle.

With this object in view the invention consists in the improvements which I shall now proceed to describe and claim.

Of the accompanying drawings, forming a part of this specification, Figure 1 represents a side elevation of a bicycle driving mechanism constructed in accordance with my invention. Fig. 2 represents a front elevation thereof. Fig. 3 represents a section on line 3 3 of Fig. 1. Fig. 4 represents a section on line 4 4 of Fig. 3. Fig. 5 represents a section on line 5 5 of Fig. 3. Fig. 6 represents an enlarged detail section of the eccentric, showing the manner of attaching it to the frame. Fig. 7 represents a detail section of the eccentric-strap, showing the provisions for taking up the wear. Fig. 8 represents a perspective view of one of the dust-caps employed.

The same reference characters indicate the same parts in all the figures.

Referring to the drawings, $a$ $a'$ $a^2$ designate the frame-bars of a bicycle-frame of the ordinary diamond type, although it will be understood that my invention is equally applicable to drop-frames and frames of other construction.

$b$ designates the rear wheel, $c$ the forward sprocket-wheel, keyed or otherwise suitably secured to the crank-axle in the usual manner, and $c'$ the driving-chain.

$a^4$ and $a^5$ are lugs integrally formed on the bicycle-frame and affording a means for attaching the eccentrics. The lower lug $a^4$, which projects forwardly and downwardly to a point beyond the rim of the sprocket-wheel $c$, is preferably attached to the barrel or crank-hanger $a^3$ of the frame, an additional lug being forged on said barrel for the attachment of said lug or projection $a^4$. The latter consists of a piece of tapered tube brazed to the said additional lug and carrying at its end a tubular cross-piece $a^6$, the end of the tube $a^4$ being lap-brazed around said cross-piece. The lug or projection $a^5$ on the frame-bar $a$ is lap-brazed around said bar $a$, and a tubular cross-piece $a^7$ is attached to it in a similar manner to the cross-bar $a^6$.

Two eccentrics are attached to the bicycle-frame, one on either side, in the position represented in Fig. 1. Each eccentric consists of a fixed portion $d$ and a strap $d'$, between which are interposed a series of antifriction-balls $d^5$ $d^5$, twelve being shown in the drawings and held apart by means of a separator $d^6$, consisting of a ring perforated for the reception of the balls. The fixed portion $d$ of the eccentric consists of a rim having integral ears $d^2$ $d^3$ $d^4$ for attachment to the bicycle-frame. The ears $d^2$ and $d^3$ are attached to the cross-pieces $a^6$ $a^7$ at the ends of the projections $a^4$ $a^5$ by means of through-bolts $e$ $e'$, said ears being slightly recessed, as shown in Fig. 6, to receive the end of the tubular cross-piece. The third ear $d^4$ on the sprocket side of the machine is longer than the other two ears, extending rearwardly past the rim of the sprocket $c$ and being attached to the rear fork $a^2$ by means of a screw $e^2$. Said fork or bar $a^2$ is preferably reinforced on the inside at the point where the screw $e^2$ enters. On the opposite side of the machine from the sprocket the ear corresponding to the ear $d^4$ (shown in Fig. 1) is somewhat shorter. This method of affixing the eccentrics to a bicycle-frame affords great rigidity, and hence a smooth working of the crank mechanism, which is essential in a device of this kind, while at the same time affording a light construction and permitting the eccentric to be easily removed and positioned.

The strap $d'$ instead of being constructed in two halves in the usual manner is made in a single piece or ring split transversely and formed at its ends with lugs $d^7$ $d^8$, having holes for the reception of securing-bolts $d^9$ $d^9$. The lug $d^7$ is apertured at $d^{12}$ for the reception of the pivot-bolt $f^2$, which forms the connection between the crank $f$ and the eccentric-strap $d'$. When the mechanism is first assembled, one or more thin metal strips or shims $d^{10}$ $d^{10}$ may be inserted between the lugs $d^7$ $d^8$, and as wear occurs in the ball-race these shims are taken out to maintain a tight adjustment. To exclude dust, the fixed part $d$ of the eccentric and the strap $d'$ are formed on their opposite edges with short flanges $d^{13}$ $d^{14}$. The ends of the crank-axle are provided with bearing-boxes through which the cranks $f$ $f$ are permitted to slide, so that when power is applied to the pedals $f'$ $f'$ the cranks will revolve the axle in the usual manner; but by reason of their connection at $f^2$ $f^2$ with the eccentric-straps said cranks will be constrained to revolve in a circle whose center is the center of the eccentric, and the pedal will therefore be farther away from the crank-axle on the downstroke and nearer to said crank-axle on the upstroke, thus giving a greater leverage on the downstroke and employing to the best advantage the rider's power. Said bearing-boxes at the ends of the axle are constructed as follows: In the present instance said axle is shown in two parts or sleeves $g$ $g$, formed to interlock at their inner ends and held together by means of a bolt $g'$. The usual antifriction-bearings $g^2$ are provided for said axle. Each sleeve $g$ is enlarged at its end to form a head or block $g^3$, which is centrally recessed to receive the crank $f$. It will be understood that these end bearing-blocks would be made separate in the case of a solid axle and keyed thereto in a suitable manner. In the recesses of each bearing-block, between said block and the crank, are interposed two hardened bearing plates or gibs $g^5$ $g^5$ to receive the wear of the antifriction-balls $g^4$ $g^4$, of which two endless rows are provided, one on either side of the crank, said cranks being preferably hardened and grooved on either side at $f^3$ $f^3$. The gibs $g^5$ are provided with apertures $g^{12}$ $g^{12}$ in their ends, through which the balls pass from the crank-grooves, while the block $g^3$ is grooved on the outside and ends to form a raceway for the idle balls. On the outside of the bearing-blocks and covering the movable parts are dust-caps $g^6$ $g^6$, having flat outer faces and inwardly-projecting flanges $g^7$ $g^7$ separated by recesses $g^{10}$ $g^{10}$. Screws $g^9$ $g^9$, passing through screw-holes $g^8$ $g^8$ in the dust-caps and screwing into the bearing-blocks $g^3$, serve to secure said dust-caps to the blocks and at the same time retain the hardened gibs $g^5$ in place in the bearing-blocks. The removability of the dust-caps renders the gibs accessible for removal or the substitution of new for worn ones. In recesses in the ends of each gib $g^5$ are placed small plungers $g^{13}$ $g^{13}$, of felt, which project into the grooves $f^3$ in the cranks and serve to exclude dust from the balls $g^{12}$. Behind the plungers are placed light springs $g^{14}$ $g^{14}$, which press said plungers against the cranks. When wear occurs in the bearing-block, the hardened plates or gibs $g^5$ may be set out by interposing thin metal shims between said gibs and the blocks $g^3$.

I do not herein claim a compensating connection between the pedal and the crank, said connection located on the opposite side of the center of the pedal path from the pedal, since the said subject-matter is claimed in a copending application filed by me December 26, 1899, Serial No. 741,587.

I claim—

In a bicycle driving mechanism, the combination of the bicycle-frame, an eccentric affixed thereto, the crank-axle having the recessed bearing-blocks at its ends, cranks operating in said blocks and attached to the eccentric-straps, the hardened bearing-gibs $g^5$ occupying the recesses in said bearing-blocks, the antifriction-balls interposed between said gibs and the cranks, the dust-cap $g^6$ covering the bearing-block and holding the gibs $g^5$ in place therein, and the screws securing said dust-cap to the bearing-block.

In testimony whereof I have affixed my signature in presence of two witnesses.

THOMAS C. ROBINSON.

Witnesses:
C. F. BROWN,
A. D. HARRISON.